(12) United States Patent
Yun

(10) Patent No.: US 7,562,986 B2
(45) Date of Patent: Jul. 21, 2009

(54) LASER PROJECTION DISPLAY

(75) Inventor: Sang Kyeong Yun, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 255 days.

(21) Appl. No.: 11/642,606

(22) Filed: Dec. 19, 2006

(65) Prior Publication Data

US 2007/0153350 A1   Jul. 5, 2007

(30) Foreign Application Priority Data

Dec. 29, 2005   (KR)   ...................... 10-2005-0133955

(51) Int. Cl.
  *G03B 21/28*   (2006.01)
  *G02B 26/08*   (2006.01)
(52) U.S. Cl. .................. 353/70; 353/77; 359/216.1
(58) Field of Classification Search ................ 359/204, 359/216, 203; 353/70, 122, 77; 250/227.26, 250/234; 345/204
See application file for complete search history.

(56) References Cited

U.S. PATENT DOCUMENTS

| | | | |
|---|---|---|---|
| 4,409,477 A * | 10/1983 | Carl | 250/227.26 |
| 4,738,499 A | 4/1988 | Mikami | |
| 5,179,271 A * | 1/1993 | Lindacher et al. | 235/462.22 |
| 5,650,869 A * | 7/1997 | Manhart et al. | 359/203 |
| 6,172,788 B1 * | 1/2001 | Suzuki et al. | 359/204 |
| 6,392,821 B1 * | 5/2002 | Benner, Jr. | 359/727 |
| 6,624,919 B2 | 9/2003 | Lambert | |
| 7,384,158 B2 * | 6/2008 | Ramachandran et al. | 353/70 |
| 2003/0142086 A1 * | 7/2003 | Watanabe et al. | 345/204 |
| 2004/0141157 A1 * | 7/2004 | Ramachandran et al. | 353/70 |
| 2004/0223126 A1 * | 11/2004 | Hatakeyama et al. | 353/122 |
| 2005/0029438 A1 * | 2/2005 | Kuribayashi | 250/234 |

* cited by examiner

*Primary Examiner*—Hung T Vy
(74) *Attorney, Agent, or Firm*—Christensen O'Connor Johnson Kindness PLLC

(57) ABSTRACT

Disclosed herein is a laser projection display. The laser projection display includes a light source for emitting light beams each having a predetermined wavelength, and reflective means for reflecting the light beams emitted from the light source and scanning the light beams across a screen.

6 Claims, 4 Drawing Sheets

170,270

170',270'

LASER PROJECTION DISPLAY

CROSS REFERENCE TO RELATED APPLICATIONS

This application claims the benefit of Korean Patent Application No. 10-2005-0133955, filed on Dec. 29, 2005, entitled "laser projection-display", which is hereby incorporated by reference in its entirety into this application.

BACKGROUND OF THE INVENTION

1. Field of the Invention

The present invention relates, in general, to a laser projection display and, more particularly, to a laser projection display, which can correct image distortion without requiring a separate image distortion correction means.

2. Description of the Related Art

A Laser Projection Display (LPD) is a device which is connected to a small-sized handheld device, for example, a mobile phone, a Personal Digital Assistant (PDA), or a mini-laptop display, and which is adapted to show a magnified image on a screen installed on, for example, a wall or ceiling. When such a small-sized LPD module is provided, multiple content items stored in a mobile phone or PDA can be easily magnified and viewed anywhere. Accordingly, Digital Multimedia Broadcast (DMB) images, which inconvenience the user due to the small screen when viewing the DMB images using a mobile phone or PDA, movies, education broadcasting, game content, etc. can be viewed as magnified images. Even though a projector is not necessarily connected to a notebook computer, presentation can be easily performed through a PDA, etc.

When using a light source for emitting point-type light beams, the display scans the light beams across a screen while moving the light beams in vertical and horizontal directions using two reflective mirrors, that is, a galvano mirror and a polygonal mirror. Further, when using a light source for emitting line-type light beams, the display scans the light beams across a screen while moving the light beams in a horizontal direction using a single reflective mirror, that is, a polygonal mirror.

An example of such a display is shown in FIG. 4.

As shown in FIG. 4, a conventional display 10 includes a light source 11, an illumination lens 12, an optical modulator 13, a color mixer 14, a projection lens 15, a galvano mirror 16, a polygonal mirror 17, and a distortion correction lens 18.

The light source 11 emits a monochromatic light beam, or red, green and blue light beams, each having a predetermined wavelength.

The illumination lens 12 condenses the light beams emitted from the light source 11 on the optical modulator 13, independently with respect to respective wavelengths, and includes a plurality of lenses, such as a diverging lens, a collimating lens, and a cylindrical lens.

The optical modulator 13 functions to modulate the condensed light beams and transmit the modulated light beams to the color mixer 14. If light beams are point-type light, a reflective optical modulator is used, whereas, if light beams are line-type light, a diffractive optical modulator is used.

The color mixer 14 focuses light beams, diffracted as 0th-order and ±1st-order diffracted light beams by the optical modulator 13, and mixes the diffracted light beams.

The projection lens 15 projects the light beams mixed by the color mixer 14 both on the galvano mirror 16 and on the polygonal mirror 17. The light beams, reflected from the galvano mirror 16 and the polygonal mirror 17, are scanned across the screen 19 while moving in vertical and horizontal directions due to respective mirrors, thus displaying an image.

In this case, since each of the reflective surfaces of the polygonal mirror 17 for reflecting light beams is planar, the distances from the reflective surface to the screen 19 are different at respective different points, thus image distortion may occur in the image displayed on the screen 19, as shown by the dotted line in the drawing. In order to prevent such image distortion, a distortion correction lens 18 is interposed between the polygonal mirror 17 and the screen 19 in the prior art.

However, the conventional display 10 having the above construction is problematic in that the distortion correction lens 18, which is a separate correction means, must be interposed between the polygonal mirror 17 and the screen 19 so as to correct image distortion, so that the number of components increases, and space for the installation of the distortion correction lens is required, thus the size of the display 10 itself increases.

SUMMARY OF THE INVENTION

Accordingly, the present invention has been made keeping in mind the above problems occurring in the prior art, and an object of the present invention is to provide a laser projection display, in which a means for correcting image distortion is directly formed in a polygonal mirror or a planar mirror, which is a reflective means, thus correcting image distortion without requiring a separate correction means.

In order to accomplish the above object, the present invention provides a laser projection display, comprising a light source for emitting light beams each having a predetermined wavelength, and reflective means for reflecting the light beams emitted from the light source, and scanning the light beams across a screen, wherein the reflective means has at least one reflective surface for reflecting the light beams, each reflective surface being formed such that distances from respective reflective points on the reflective surface to a corresponding scanning point on the screen are equal to each other, in order to correct image distortion.

In the laser projection display, the reflective means may be a polygonal mirror having a plurality of reflective surfaces and reflecting the light beams while rotating at a predetermined speed, or a planar mirror having a single reflective surface and reflecting the light beams while swinging at a predetermined angle. Further, the reflective surface may be a curved surface having a predetermined curvature.

In accordance with an embodiment of the present invention, there is provided a laser projection display, comprising a light source for emitting point-type light beams, a reflective optical modulator for reflecting and modulating the light beams emitted from the light source, a color mixer for mixing colors of the light beams modulated by the optical modulator, a galvano mirror for reflecting the light beams, the colors of which have been mixed by the color mixer, and reflective means for reflecting the light beams received from the galvano mirror and scanning the light beams across a screen, wherein the light beams are moved in a vertical direction by the galvano mirror and are moved in a horizontal direction by the reflective means, and the reflective means includes at least one reflective surface for reflecting the light beams, the reflective surface being formed such that distances from respective reflective points on the reflective surface to a corresponding scanning point on the screen are equal to each other, in order to correct an image distortion.

Preferably, the light source may be capable of controlling light intensity, or the display may further comprise light intensity control means upstream of the optical modulator so as to control light intensity.

In accordance with another embodiment of the present invention, there is provided a laser projection display, comprising a light source for emitting line-type light beams, a diffractive optical modulator for diffracting and modulating the light beams emitted from the light source, a color mixer for mixing colors of the light beams modulated by the optical modulator, and reflective means for reflecting the light beams, the colors of which have been mixed by the color mixer, and scanning the reflected light beams across a screen, wherein the light beams are moved in a horizontal direction by the reflective means, and the reflective means includes at least one reflective surface for reflecting the light beams, the reflective surface being formed such that distances from respective reflective points on the reflective surface to a corresponding scanning point on the screen are equal to each other in order to correct image distortion.

In the two embodiments, the reflective means may be a polygonal mirror having a plurality of reflective surfaces and reflecting the light beams while rotating at a predetermined speed, or a planar mirror having a single reflective surface and reflecting the light beams while swinging at a predetermined angle. Further, the reflective surface may be a curved surface having a predetermined curvature.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
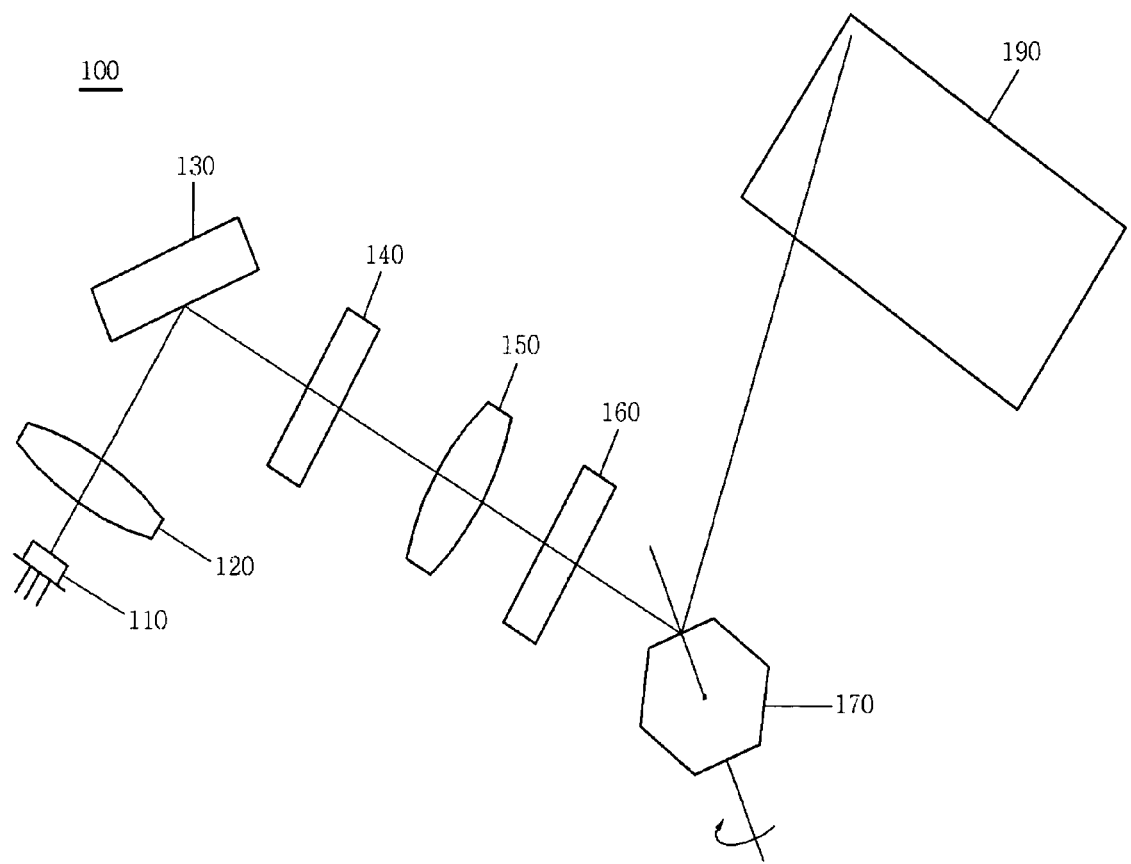
FIG. 1 is a schematic diagram of a laser projection display according to an embodiment of the present invention.

Reference now should be made to the drawings, in which the same reference numerals are used throughout the different drawings to designate the same or similar components.

Hereinafter, a laser projection display according to embodiments of the present invention will be described in detail with reference to the attached drawings.

First, a laser projection display 100 according to an embodiment of the present invention is described with reference to FIG. 1.

As shown in FIG. 1, the display 100 according to the embodiment of the present invention includes a light source 110, an illumination lens 120, an optical modulator 130, a color mixer 140, a projection lens 150, a galvano mirror 160, and a polygonal mirror 170.

The light source 110 functions to emit a monochromatic light beam, or red, green and blue light beams, each having a predetermined wavelength. In this embodiment, a light source, which emits point-type light beams, and the light intensity of which is controlled, is adopted as the light source 110. Meanwhile, when a light source, the light intensity of which is not controlled, is adopted, a control means for controlling light intensity must be provided upstream of the optical modulator 130. That is, the brightness of an image can be controlled only when the light intensity must be controlled in this way.

The illumination lens 120 functions to condense the light beams, emitted from the light source 110, on the optical modulator, 130 independently with respect to respective wavelengths, and includes a plurality of lenses, such as a diverging lens, a collimating lens, and a cylindrical lens.

The optical modulator 130 functions to modulate the condensed light beams and transmit the modulated light beams to the color mixer 140. In this embodiment, a reflective optical modulator is adopted as the optical modulator 130 because light intensity is controlled by the light source 110 or the light intensity control means provided upstream of the optical modulator 130. In this case, the displacement of a microdriver, which uses a driving force, such as electrostatic force, piezoelectric/electrostriction force, or magnetic force, is controlled, thus the reflection of the optical modulator 130 can be controlled.

The color mixer 140 focuses and mixes the light beams reflected by the optical modulator 130.

The projection lens 150 projects the light beams mixed by the color mixer 140 both on the galvano mirror 160 and on the polygonal mirror 170.

The galvano mirror 160 moves the light beams projected from the projection lens 150 in the vertical direction of a screen 190, and the polygonal mirror 170 moves the light beams projected from the projection lens 150 in the horizontal direction of the screen 190. In this case, the galvano mirror 160 repeatedly performs an operation of inclining at a predetermined angle and recovering its original position using a driving means (not shown), thus moving the light beams in the vertical direction. The polygonal mirror 170 is rotated at a predetermined speed by another driving means (not shown), thus moving the light beams in the horizontal direction.

In this way, the light beams are scanned across the screen 190 in vertical and horizontal directions, thereby displaying an image. The polygonal mirror 170 adopted in the present embodiment will be described in detail with reference to FIG. 3A.

Next, a laser projection display 200 according to another embodiment of the present invention is described with reference to FIG. 2.

Figure 2:
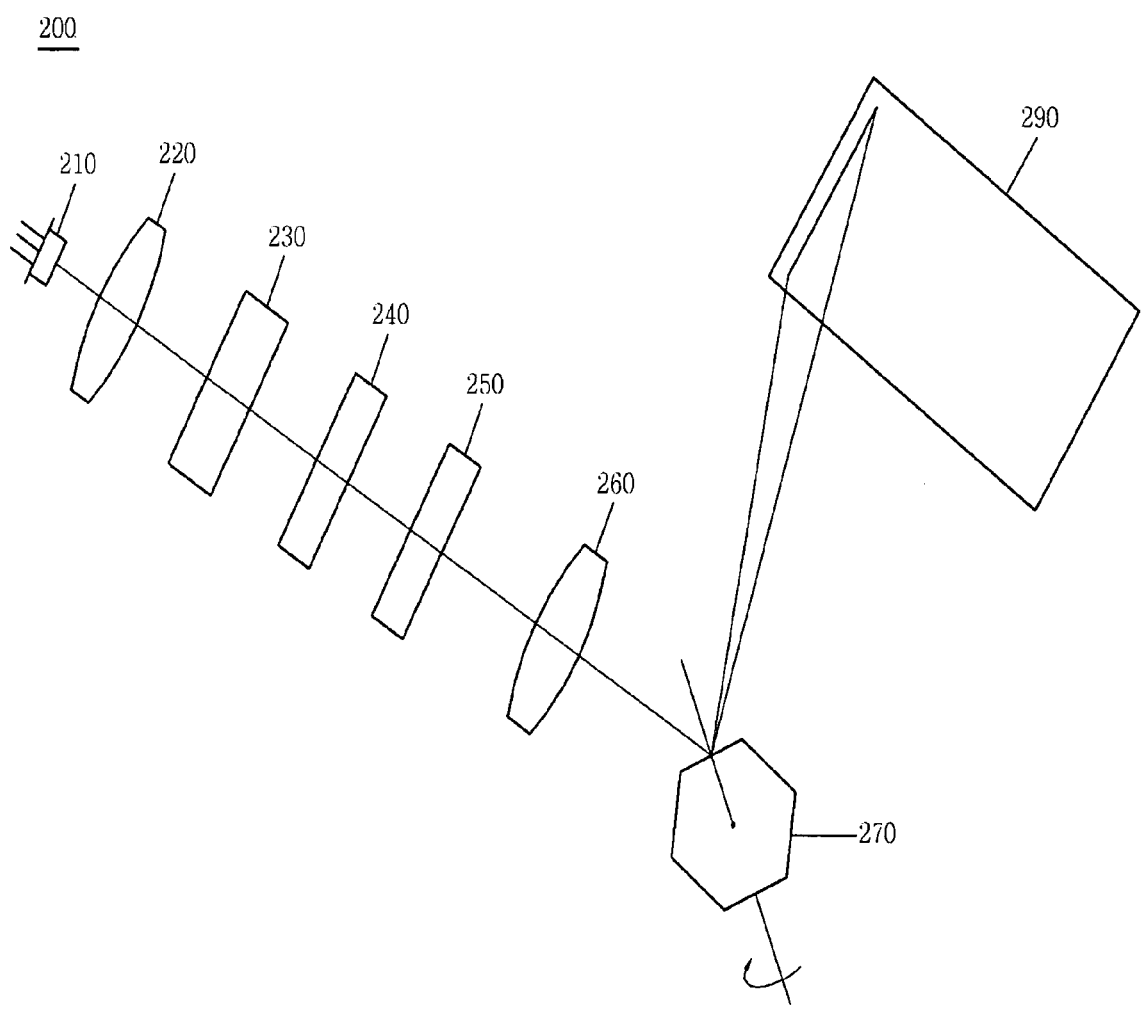
FIG. 2 is a schematic diagram of a laser projection display according to another embodiment of the present invention.

As shown in FIG. 2, the display 200 according to the embodiment of the present invention includes a light source 210, an illumination lens 220, an optical modulator 230, a filter 240, a color mixer 250, a projection lens 260, and a polygonal mirror 270.

The light source 210 functions to emit a monochromatic light beam or red, green and blue light beams, each having a predetermined wavelength. In this embodiment, a light source for emitting line-type light beams is adopted as the light source.

The illumination lens 220 functions to condense the light beams, emitted from the light source 210, on the optical modulator 230, independently with respect to respective wavelengths, and includes a plurality of lenses, such as a diverging lens, a collimating lens, and a cylindrical lens.

The optical modulator 230 functions to modulate the condensed light beams and transmit the modulated light beams to the color mixer 240. In this embodiment, a diffractive optical modulator is adopted as the optical modulator 230, unlike the above embodiment. The diffractive optical modulator determines the intensities of the emitted red, green and blue light beams for respective wavelengths, depending on the amount of reflection/diffraction control for a corresponding pixel. In this case, the pixel can be controlled in a digital manner, an analog manner, or a manner which is a combination thereof. Further, the displacement of a micro-driver that uses a driving force, such as electrostatic force, piezoelectric/electrostriction force, or magnetic force, is controlled, thus the diffraction of the optical modulator 230 can be controlled.

Each of the red, green and blue light beams generated through the control of the displacement of the optical modulator 230 for respective pixels is separated into 0th-order and ±1st-order or higher-order diffracted light beams.

The filter 240 selectively passes the diffracted light beams, diffracted and separated by the optical modulator 230, and obtains only desired diffracted light beams from the diffracted light beams. In this embodiment, the filter 240 is arranged upstream of the color mixer 250, but can alternatively be arranged downstream of the color mixer 250.

The color mixer 250 focuses and mixes the light beams diffracted by the optical modulator 230.

The projection lens 260 projects the light beams mixed by the color mixer 250 on the polygonal mirror 270.

The polygonal mirror 270 moves the light beams, projected from the projection lens 260, in the horizontal direction of a screen 290. In this case, the polygonal mirror 270 is rotated at a predetermined speed by a driving means (not shown), thus moving the light beams in the horizontal direction.

In this embodiment, since the light source 210 emits line-type light beams, unlike the above embodiment, a galvano mirror, which is a means for moving light beams in a vertical direction, is not necessary, and an image is displayed on the screen 290 only by moving the light beams in the horizontal direction using the polygonal mirror 270. The polygonal mirror adopted in the present embodiment will be described in detail with reference to FIG. 3A.

Figure 3A:
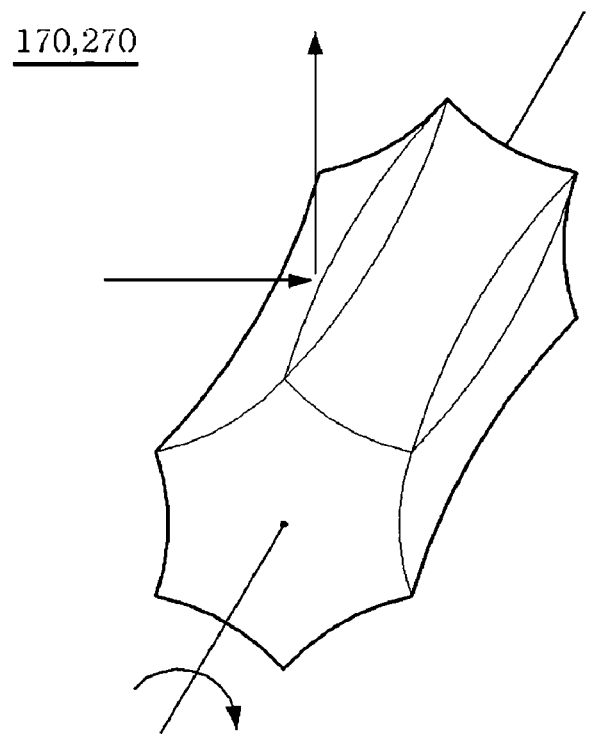
FIG. 3A is a schematic perspective view showing a polygonal mirror, which is a reflective means applied to FIGS. 1 and 2.

The polygonal mirrors 170 and 270, adopted in the displays 100 and 200 of FIGS. 1 and 2, respectively, are described in detail, with reference to FIG. 3A.

As shown in FIG. 3A, each of the polygonal mirrors 170 and 270 has a cubic shape having six reflective surfaces. Each reflective surface is processed as a curved surface to have a shape corresponding to an image distortion shape, which occurs in the prior art when the reflective surface is a planar surface. Through such processing, since the distances from all reflective points on the reflective surface to a corresponding scanning point on the screen become equal to each other, a phenomenon in which an image is distorted due to differences in the distance between the reflective surface and the screen can be prevented. In this case, the polygonal mirrors 170 and 270 are each formed to have six reflective surfaces, but may be each formed to have 4, 8 or more reflective surfaces, depending on the scanning reflection conditions, as alternative embodiments.

Figure 3B:
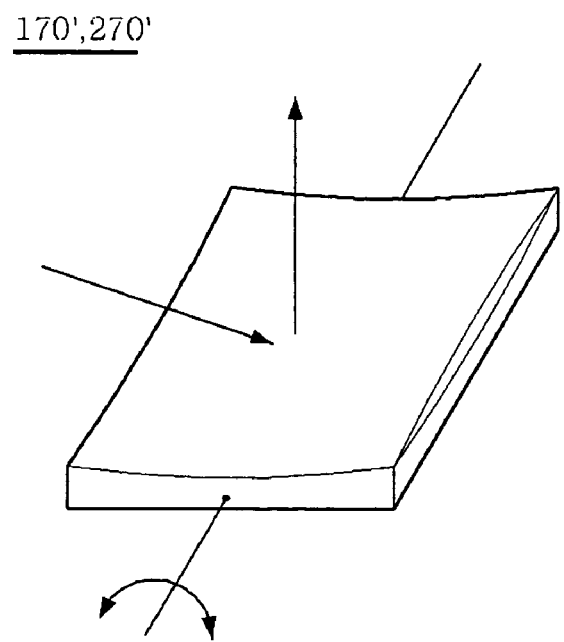
FIG. 3B is a schematic perspective view showing a planar mirror, which is another reflective means replaceable with the polygonal mirror of FIG. 3A.
Figure 4:
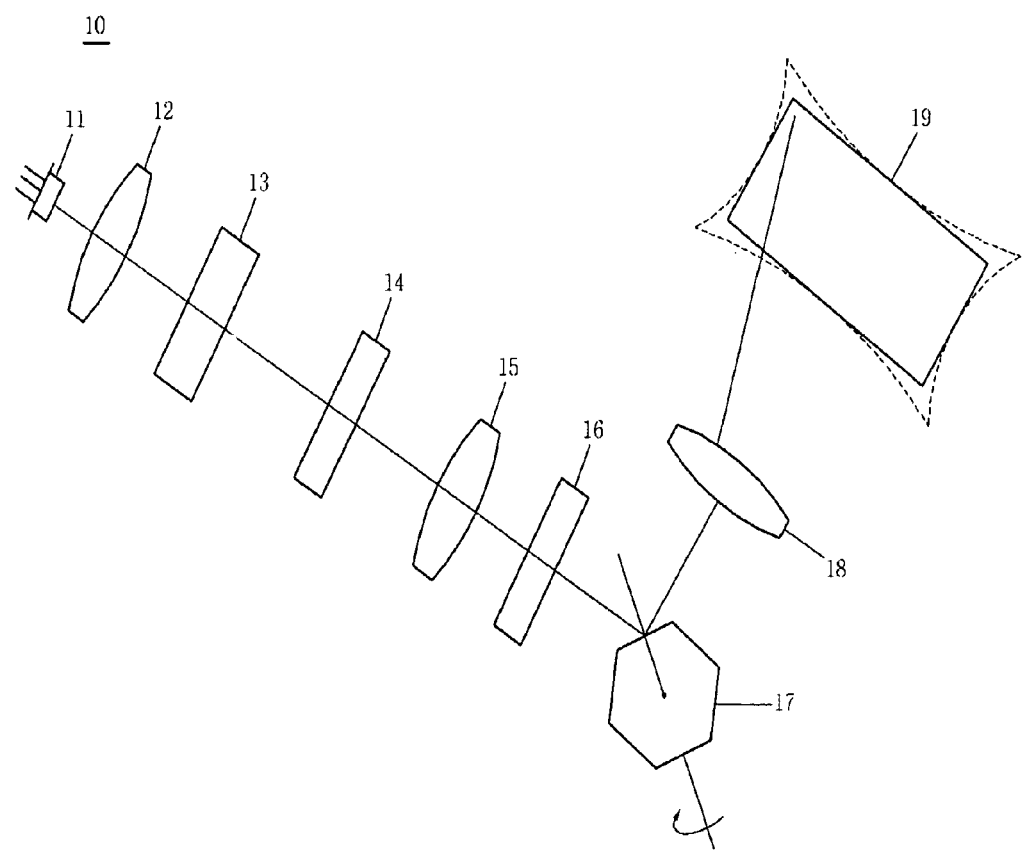
FIG. 4 is a schematic diagram of a conventional laser projection display.

In the above embodiment, a polygonal mirror is used as a means for reflecting light beams and scanning the light beams across the screen in a horizontal direction, but a planar mirror can be used, as shown in FIG. 3B, which shows another embodiment.

As shown in FIG. 3B, each of planar mirrors 170' and 270' is formed so that a reflective surface is provided only on one side thereof, and a curved surface, as shown in FIG. 3A, is formed on the reflective surface. Each of the planar mirrors 170' and 270' moves reflected light beams to the screen in a horizontal direction while repeatedly swinging clockwise/counterclockwise at a certain angle using a driving means (not shown).

According to the laser projection display of the present invention, since the means for correcting image distortion is directly formed in a polygonal mirror or a planar mirror, which is a scanning reflective means, there is no need to install a separate distortion correction means between a polygonal mirror and a screen, unlike a conventional display, so that the number of components can decrease, and space for the installation of the distortion correction means is not necessary, thus the overall size of the display can be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A laser projection display, comprising:
   a light source for emitting light beams each having a predetermined wavelength; and
   reflective means for reflecting the light beams emitted from the light source and for creating a display by scanning the light beams across a display surface;
   wherein the reflective means has at least one reflective surface for reflecting the light beams, each said reflective surface being:
   substantially smaller in area than the area of the created display, and
   formed such that distances from respective reflective points on the reflective surface to a corresponding scanning point on the display surface are substantially equal to each other, in order to correct image distortion;
   wherein the reflective means comprises:
   a polygonal mirror having a plurality of reflective surfaces; and
   a drive system for driving the polygonal mirror,
   the polygonal mirror reflecting the light beams across the display surface while rotating at a predetermined speed; and
   wherein the reflective surface is a curved surface having a predetermined curvature.

2. The laser projection display of claim 1, wherein the created display is substantially rectangular in shape.

3. A laser projection display, comprising:
   a light source for emitting point-type light beams;
   a reflective optical modulator for reflecting and modulating the light beams emitted from the light source;
   a color mixer for mixing colors of the light beams modulated by the optical modulator;
   a galvano mirror for reflecting the light beams, the colors of which have been mixed by the color mixer;
   a first drive system for the galvano mirror;
   reflective means for reflecting the light beams received from the galvano mirror and scanning the light beams across a display; and
   a second drive system for the reflecting means;
   wherein the light beams are moved in a first direction by the galvano mirror as the galvano mirror is driven by the first drive system and are moved in a second direction transverse to the first direction by the reflective means as the reflective means is being driven by use of the second drive system, and
   wherein the reflective means includes at least one reflective surface for reflecting the light beams, the reflective surface being:

shaped such that distances from respective reflective points on the reflective surface to a corresponding scanning point on the display are substantially equal to each other, in order to correct an image distortion; and of a size substantially smaller than the size of the display; and wherein the reflective means is a polygonal mirror having a plurality of reflective surfaces, the polygonal mirror reflecting the light beams across the display surface while rotating at a predetermined speed under the influence of the second drive system; and wherein the reflective surface is a curved surface having a predetermined curvature.

4. The laser projection display according to claim 3, wherein the light source is capable of controlling light intensity, or the display further comprises light intensity control means upstream of the optical modulator so as to control light intensity.

5. The laser projection display of claim 3, wherein the display is substantially rectangular in shape.

6. A laser projection display, comprising:
a light source for emitting line-type light beams;
a diffractive optical modulator for diffracting and modulating the light beams emitted from the light source;
a color mixer for mixing colors of the light beams modulated by the optical modulator;
reflective means for reflecting the light beams, the colors of which have been mixed by the color mixer and for scanning the reflected light beams across a display;
a drive system for moving the reflective means to scan the reflected light beams across a display;
wherein the light beams are moved across the display by the reflective means under the influence of the drive system, and
wherein the reflective means includes at least one reflective surface for reflecting the light beams, the reflective surface being:
formed such that distances from respective reflective points on the reflective surface to a corresponding scanning point on the display are substantially equal to each other in order to correct image distortion; and
being of area substantially smaller than the area of the display, and
wherein the reflective means is a polygonal mirror having a plurality of reflective surfaces, the polygonal mirror reflecting the light beams across the display surface while rotating at a predetermined speed under the influence of the drive system; and
wherein the reflective surface is a curved surface having a predetermined curvature.

* * * * *